US012611769B2

(12) United States Patent
Sato et al.

(10) Patent No.: US 12,611,769 B2
(45) Date of Patent: Apr. 28, 2026

(54) ROBOT

(71) Applicant: CANON KABUSHIKI KAISHA, Tokyo (JP)

(72) Inventors: Shuuichi Sato, Kanagawa (JP); Kohei Oyu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 18/067,451

(22) Filed: Dec. 16, 2022

(65) Prior Publication Data

US 2023/0202036 A1       Jun. 29, 2023

(30) Foreign Application Priority Data

Dec. 24, 2021    (JP) .................................. 2021-210671

(51) Int. Cl.
| | |
|---|---|
| *B25J 9/16* | (2006.01) |
| *B25J 17/02* | (2006.01) |
| *B25J 13/08* | (2006.01) |

(52) U.S. Cl.
CPC ............. *B25J 9/1633* (2013.01); *B25J 17/02* (2013.01); *B25J 13/085* (2013.01)

(58) Field of Classification Search
CPC ......... B25J 9/1633; B25J 13/085; B25J 17/02
See application file for complete search history.

(56) References Cited

U.S. PATENT DOCUMENTS

| | | | | | |
|---|---|---|---|---|---|
| 9,827,682 | B2 * | 11/2017 | Adachi | .................... | B25J 9/108 |
| 2016/0221193 | A1 | 8/2016 | Sato | | |

| | | | | |
|---|---|---|---|---|
| 2016/0263749 | A1 | 9/2016 | Ogata | |
| 2019/0025143 | A1 * | 1/2019 | Doll | ....................... G01L 5/1627 |
| 2020/0284667 | A1 * | 9/2020 | Glusiec | ................. G01L 1/2206 |

FOREIGN PATENT DOCUMENTS

| | | | |
|---|---|---|---|
| CN | 104215372 | A | 12/2014 |
| CN | 113070901 | A | 7/2021 |
| CN | 214643773 | U | 11/2021 |
| DE | 103 04 359 | A1 | 11/2003 |
| DE | 10 2007 063099 | A | 7/2009 |
| DE | 10 2019 134392 | A1 | 6/2021 |
| DE | 11 2021 001 706 | T5 | 1/2023 |
| JP | H10286789 | A | 10/1998 |
| JP | 2013013964 | A | 1/2013 |
| JP | 2017096929 | A | 6/2017 |
| JP | 2017120243 | A | 7/2017 |
| JP | 2017177263 | A | 10/2017 |
| JP | 2019-90718 | A | 6/2019 |
| JP | 2019089143 | A | 6/2019 |

* cited by examiner

*Primary Examiner* — William C Joyce
(74) *Attorney, Agent, or Firm* — Canon U.S.A., Inc. IP Division

(57)       ABSTRACT

A robot includes a plurality of joints including a first joint and a second joint, wherein each of the first joint and the second joint including a first support member, a second support member facing the first support member and configured to be displaceable relative to the first support member, an elastic member configured to connect the first support member and the second support member, and a torque sensor including a detection unit configured to detect a relative displacement amount between the first support member and the second support member, and wherein a number of the elastic members of the torque sensor in the first joint is different from a number of the elastic members of the torque sensor in the second joint.

35 Claims, 16 Drawing Sheets

FIG.6

|  | UNIT | J1 | J2 | J3 | J4 | J5 | J6 |
|---|---|---|---|---|---|---|---|
| ELASTIC MEMBER | NUMBER | 12 | 8~12 | 8~12 | 4~8 | 4~8 | 4 |
| DETECTION UNIT | NUMBER | 8 | 4~8 | 4~8 | 2~4 | 2~4 | 1 |
| STIFFNESS (DETECTION DIRECTION) | kNm/rad | 107 | 144 | 144 | 55 | 77 | 44 |
| RESOLUTION | mNm | 6 | 7 | 7 | 4 | 4.5 | 4 |
| ACCURACY | Nm | 1.2 | 1.28 | 1.28 | 0.78 | 0.88 | 0.63 |

FIG.7

| | UNIT | J1 | J2 | J3 | J4 | J5 | J6 |
|---|---|---|---|---|---|---|---|
| ELASTIC MEMBER | NUMBER | 12 | 4~8 | 4~8 | 8~12 | 8~12 | 12 |
| DETECTION UNIT | NUMBER | 8 | 2~4 | 2~4 | 4~8 | 4~8 | 8 |
| STIFFNESS (DETECTION DIRECTION) | kNm/rad | 107 | 55 | 77 | 144 | 144 | 107 |
| RESOLUTION | mNm | 6 | 4 | 4.5 | 7 | 7 | 6 |
| ACCURACY | Nm | 1.2 | 0.78 | 0.88 | 1.28 | 1.28 | 1.2 |

FIG.8

| | UNIT | J1 | J2 | J3 | J4 | J5 | J6 |
|---|---|---|---|---|---|---|---|
| ELASTIC MEMBER | NUMBER | 12 | 4~8 | 8~12 | 4~8 | 8~12 | 4 |
| DETECTION UNIT | NUMBER | 8 | 2~4 | 4~8 | 2~4 | 4~8 | 1 |
| STIFFNESS (DETECTION DIRECTION) | kNm/rad | 107 | 55 | 144 | 77 | 144 | 44 |
| RESOLUTION | mNm | 6 | 4 | 7 | 4.5 | 7 | 4 |
| ACCURACY | Nm | 1.2 | 0.78 | 1.28 | 0.88 | 1.28 | 0.63 |

FIG.9

|  | UNIT | J1 | J2 | J3 | J4 | J5 | J6 |
|---|---|---|---|---|---|---|---|
| ELASTIC MEMBER | NUMBER | 4 | 4~8 | 4~8 | 8~12 | 8~12 | 12 |
| DETECTION UNIT | NUMBER | 1 | 2~4 | 2~4 | 4~8 | 4~8 | 8 |
| STIFFNESS (DETECTION DIRECTION) | kNm/rad | 44 | 55 | 77 | 144 | 144 | 107 |
| RESOLUTION | mNm | 4 | 4 | 4.5 | 7 | 7 | 6 |
| ACCURACY | Nm | 0.63 | 0.78 | 0.88 | 1.28 | 1.28 | 1.2 |

FIG.10

| | UNIT | A | B | C |
|---|---|---|---|---|
| ELASTIC MEMBER | NUMBER | 8~12 | 4~8 | 4 |
| DETECTION UNIT | NUMBER | 4~8 | 2~4 | 1 |
| STIFFNESS (DETECTION DIRECTION) | kNm/rad | 144 | 77 | 44 |
| RESOLUTION | mNm | 7 | 4.5 | 4 |
| ACCURACY | Nm | 1.28 | 0.88 | 0.63 |

| | UNIT | A | B | C |
|---|---|---|---|---|
| ELASTIC MEMBER | NUMBER | 8~12 | 4 | 4~8 |
| DETECTION UNIT | NUMBER | 4~8 | 1 | 2~4 |
| STIFFNESS (DETECTION DIRECTION) | kNm/rad | 144 | 44 | 77 |
| RESOLUTION | mNm | 7 | 4 | 4.5 |
| ACCURACY | Nm | 1.28 | 0.63 | 0.88 |

| | UNIT | A | B | C |
|---|---|---|---|---|
| ELASTIC MEMBER | NUMBER | 4~8 | 4 | 8~12 |
| DETECTION UNIT | NUMBER | 2~4 | 1 | 4~8 |
| STIFFNESS (DETECTION DIRECTION) | kNm/rad | 77 | 44 | 144 |
| RESOLUTION | mNm | 4.5 | 4 | 7 |
| ACCURACY | Nm | 0.88 | 0.63 | 1.28 |

| | UNIT | A | B | C |
|---|---|---|---|---|
| ELASTIC MEMBER | NUMBER | 4~8 | 8~12 | 4 |
| DETECTION UNIT | NUMBER | 2~4 | 4~8 | 1 |
| STIFFNESS (DETECTION DIRECTION) | kNm/rad | 77 | 144 | 44 |
| RESOLUTION | mNm | 4.5 | 7 | 4 |
| ACCURACY | Nm | 0.88 | 1.28 | 0.63 |

| | UNIT | A | B | C |
|---|---|---|---|---|
| ELASTIC MEMBER | NUMBER | 4 | 8~12 | 4~8 |
| DETECTION UNIT | NUMBER | 1 | 4~8 | 2~4 |
| STIFFNESS (DETECTION DIRECTION) | kNm/rad | 44 | 144 | 77 |
| RESOLUTION | mNm | 4 | 7 | 4.5 |
| ACCURACY | Nm | 0.63 | 1.28 | 0.88 |

| | UNIT | A | B | C |
|---|---|---|---|---|
| ELASTIC MEMBER | NUMBER | 4 | 4~8 | 8~12 |
| DETECTION UNIT | NUMBER | 1 | 2~4 | 4~8 |
| STIFFNESS (DETECTION DIRECTION) | kNm/rad | 44 | 77 | 144 |
| RESOLUTION | mNm | 4 | 4.5 | 7 |
| ACCURACY | Nm | 0.63 | 0.88 | 1.28 |

ROBOT

BACKGROUND

Field of the Disclosure

The present disclosure relates to a robot.

Description of the Related Art

Robot apparatuses are used in production lines of various industrial products. These types of robot apparatuses are required to meet demands that operations should be performed highly accurately to assemble work, such as soft objects, light objects, and low-strength members.

Japanese Patent Application Laid-open No. H10-286789 discusses a configuration in which a torque detection device for detecting torque applied to a joint is disposed in each joint of a robot arm, as a method of detecting forces acting on a piece of work.

According to the configuration discussed in Japanese Patent Application Laid-open No. H10-286789, a same sensor is disposed in all joints. However, in a case of a multi-joint robot, operation environments of individual joints are different from each other in accordance with the ambient environment of a motor, a speed reducer, and the like. Consequently, if the same sensor is disposed in all the joints, the operation accuracy of the multi-joint robot may be decreased.

SUMMARY

Aspects of the present disclosure are directed to a technique for improving an operation accuracy of a robot.

According to an aspect of the present disclosure, a robot includes a plurality of joints including a first joint and a second joint, wherein each of the first joint and the second joint including a first support member, a second support member facing the first support member and configured to be displaceable relative to the first support member, an elastic member configured to connect the first support member and the second support member, and a torque sensor including a detection unit configured to detect a relative displacement amount between the first support member and the second support member, and wherein a number of the elastic members of the torque sensor in the first joint is different from a number of the elastic members of the torque sensor in the second joint.

Further features of the present disclosure will become apparent from the following description of embodiments with reference to the attached drawings.

BRIEF DESCRIPTION OF THE DRAWINGS

FIG. 6 is a table illustrating characteristics of each joint according to a first embodiment.

FIG. 7 is a table illustrating characteristics of each joint according to a second embodiment.

FIG. 8 is a table illustrating characteristics of each joint according to a third embodiment.

FIG. 9 is a table illustrating characteristics of each joint according to a fourth embodiment.

FIG. 10 is a diagram including table illustrating characteristics of each joint according to a fifth embodiment.

DESCRIPTION OF THE EMBODIMENTS

Hereinbelow, embodiments of the present disclosure will be described with reference to the attached drawings. Note that each of the embodiments described below is merely one embodiment, and the present disclosure is not limited thereto. In addition, common configurations are described with reference to a plurality of drawings mutually, and redundant descriptions of components with the same symbols or numbers are omitted as appropriate. Different items with a same name can be distinguished by adding "first" or "second" at the head of each item, like "first item" or "second item".

Figures 1A, 1B:
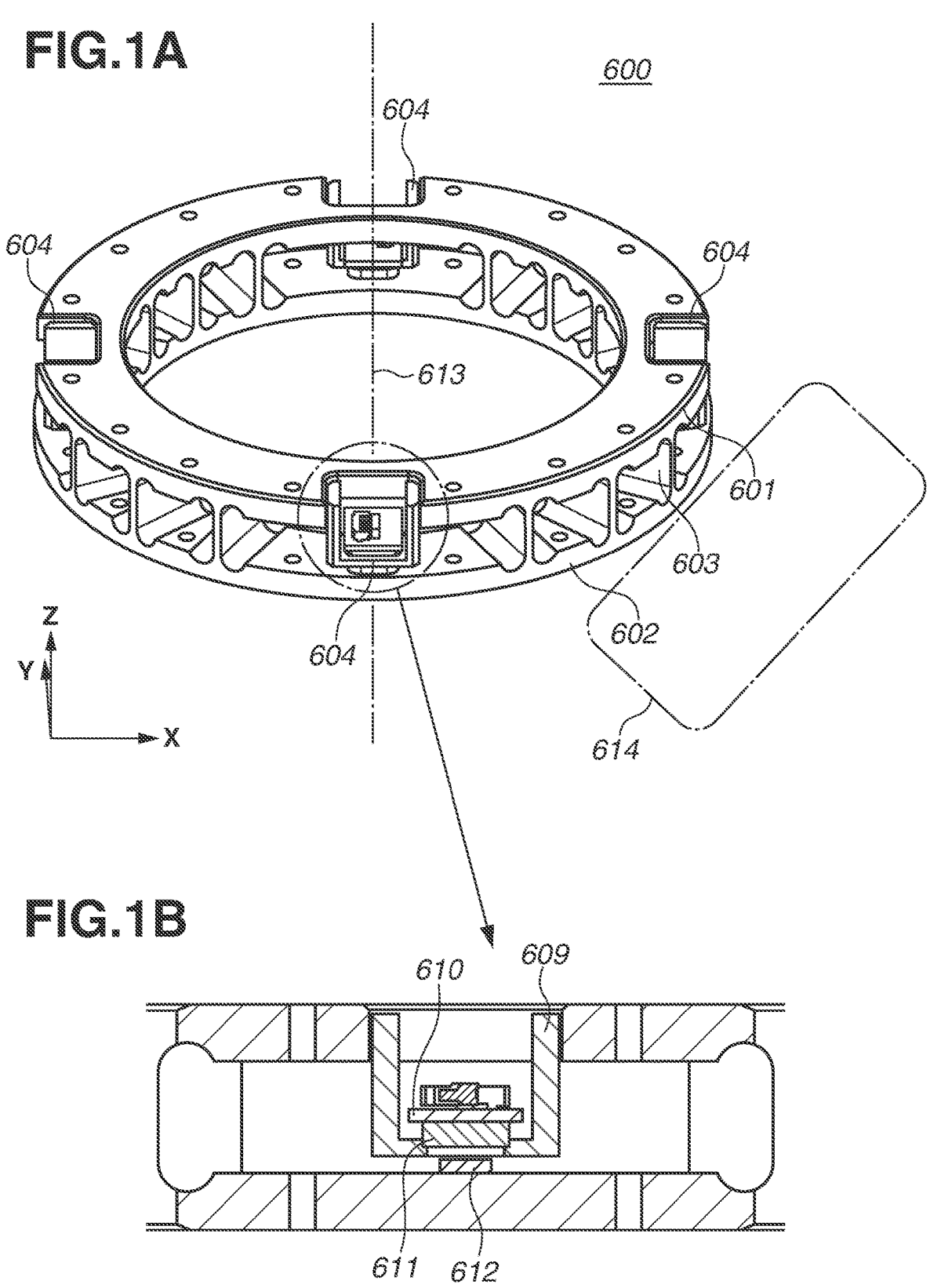
FIG. 1A is a diagram illustrating an example of a torque sensor.
FIG. 1B is an enlarged view of a detection unit.

With reference to FIGS. 1A and 1B, an example configuration of a torque sensor 600 (hereinbelow, simply referred to as a sensor 600) for detecting a torque according to a first embodiment.

The sensor 600 is provided in each of joints J1 to J6. The sensor 600 includes detection units 604 for detecting torque applied to the sensor 600 and a structure 614. The structure 614 can be a structure including a support member 601, a support member 602 facing the support member 601, elastic members 603 connecting the support members 601 and 602. The structure 614 can be integrally formed as a unit or can be formed by combining separate members. The sensor 600 is not necessarily provided in each of all the joints J1 to J6 and can be provided in each of two or more joints among the joints J1 to J6.

Each portion of the structure 614 is formed of a predetermined material, such as resin and metal (e.g., steel or stainless-steel), with an elastic (spring) coefficient satisfying a target torque detection range and a required resolution. A plurality of the elastic members 603 (twelve, in this example) is arranged around a rotation axis 613. The sensor 600 with a desired elastic (spring) coefficient is formed by selecting the number of the elastic members 603, a shape (thickness), and a material. The structure 614 can be produced using a three-dimensional (3D) printer. More specifically, the structure 614 can be produced by generating slice data, which is data for the 3D printer, from design data (e.g., computer-aided design (CAD) data) of the structure 614 and inputting the slice data into a conventional 3D printer.

Four detection units 604 are arranged at approximately 90 degree intervals. While, in the present embodiment, the number of the detection units 604 is four, but one or a plurality of the detection units 604 can be disposed as long as at least one detection unit 604 is provided.

FIG. 1B is a cross-section diagram illustrating the detection unit 604 disposed in the sensor 600. A detection substrate 610 provided with a detection head 611 is bonded and fixed to a stay 609 (double-sided adhesive tape can also be used) for fixing the detection substrate 610. The stay 609 is bonded and fixed to the support member 601. A scale 612 reflecting light emitted from the detection head 611 is bonded and fixed to the support member 602.

The detection substrate 610 has a function of an optical position sensor (encoder). The detection head 611 is configured of a reflection type optical sensor including a light-emitting element (not illustrated) and a light-receiving element (not illustrated). The scale 612 has a pattern surface facing the detection head 611, and the pattern surface has a scale pattern (not illustrated in detail). The scale pattern has shades and reflection ratios in regular arrangements formed by using a predetermined pattern.

The detection head 611 emits light from the light-emitting element to the scale 612, and the light-receiving element receives the light reflected by the scale 612. In this configuration, in a case where torque around the rotation axis 613 acts on the sensor 600 and the structure 614 deforms in an x-axis direction, a relative position between the detection head 611 and the scale 612 changes, and consequently a position of the light emitted onto the scale 612 moves on the scale 612. In this state, in a case where the light emitted onto the scale 612 passes through the scale pattern on the scale 612, the light amount detected by the light-receiving element of the detection head 611 changes. Based on the change of the light amount, a relative displacement amount between the scale 612 and the detection head 611 is detected.

The displacement amount detected by the detection head 611 is converted into a torque acted on the structure 614 by a torque-detection control unit implemented by a control routine executed by a control apparatus 300.

In the present embodiment, as illustrated in FIG. 1A, the two detection units 604 are arranged at opposing positions on a same diameter with the rotation axis 613 as a reference. In this case, calculation processing of an average value obtained by averaging torque detection values output from the corresponding detection heads 611 is performed. In this way, influences of other axial forces acting on directions other than the target torque detection direction can be reduced.

Further, a detection value related to the relative displacement is obtained from the detection units 604 arranged on line symmetry positions or point symmetry positions on a same diameter with the rotation axis 613 as a center. Accordingly, by averaging outputs of the plurality of detection units 604, highly accurate and highly reliable relative displacement information or the torque detection value based on the relative displacement information can be obtained. As described above, since the torque detection value is obtained by the averaging, accuracy of the torque detection value increases with an increase in the number of the detection units 604. On the other hand, the increase of the number of the detection units 604 increases the cost. Thus, the number of the detection units 604 suitable for the torque of each of the joints J1 to J6 needs to be determined efficiently.

Figure 2:
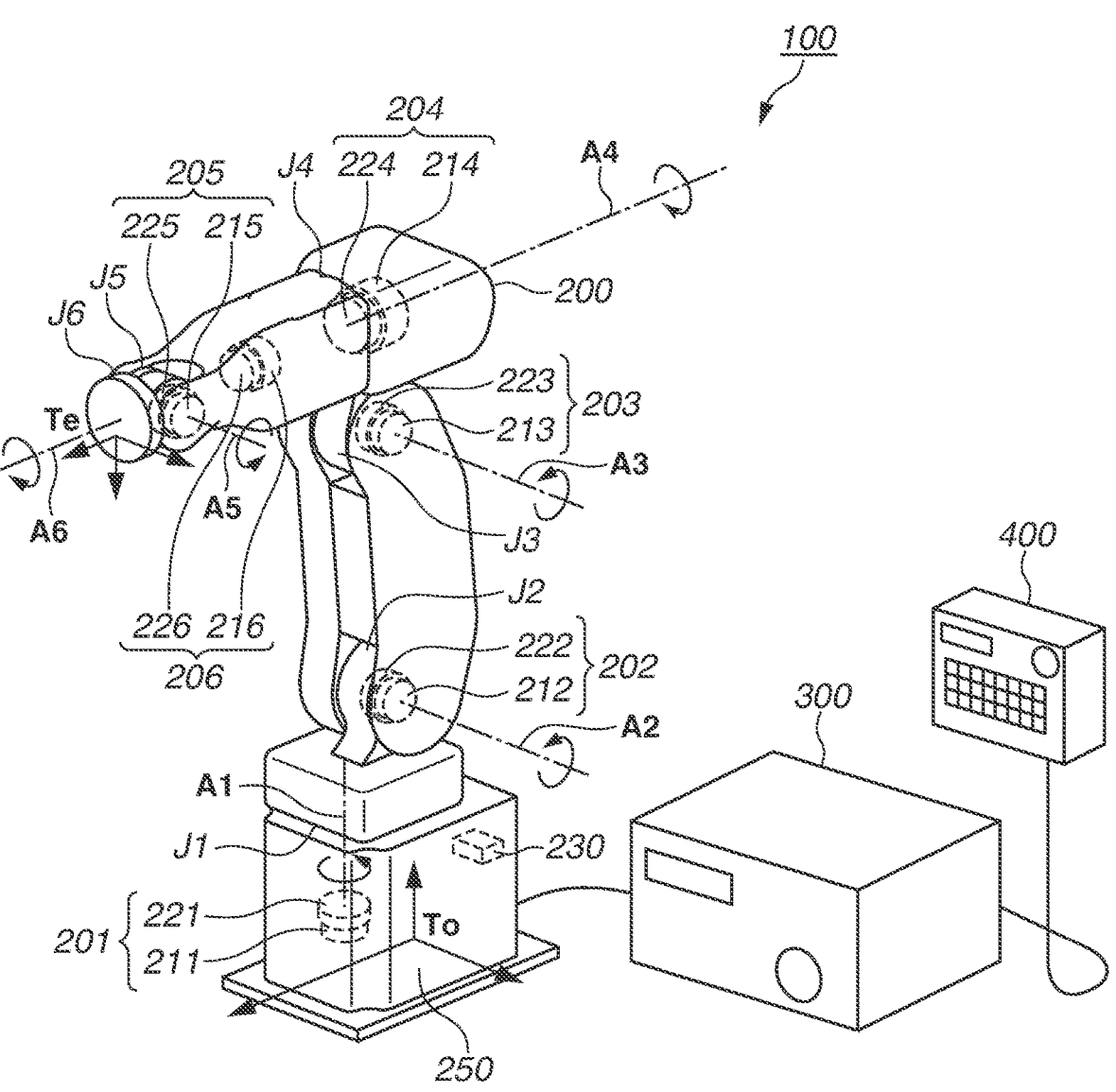
FIG. 2 is a diagram illustrating a robot on which torque sensors are mounted.

Next, with reference to FIG. 2, a robot apparatus 100 including the above-described sensors 600 will be described.

The robot apparatus 100 includes a robot arm (robot) 200 as a multi-joint robot, the control apparatus 300 for controlling the robot arm 200, and a teaching pendant 400. The teaching pendant 400 is a teaching device that transmits data of a plurality of teaching points to the control apparatus 300 and is used by an operator to designate an operation of the robot arm 200.

While, in the present embodiment, the robot arm 200 is a 6-joint robot, the number of joints can be any number more than one. The robot arm 200 includes a plurality of servomotors 201 to 206 for rotationally driving the joints J1 to J6 around joint axes A1 to A6, respectively. The robot arm 200 can move a leading end of the robot arm 200 to take any attitude at any three-dimensional position in three directions within a movable range. In general, the position and the attitude of the robot arm 200 can be expressed using a coordinate system. "To" indicates a coordinate system fixed to a base 250 of the robot arm 200, and "Te" indicates a coordinate system fixed to a hand leading end portion of the robot arm 200.

In the present embodiment, the servomotors 201 to 206 include electric motors 211 to 216, respectively, and sensor units 221 to 226, respectively, and the sensor units 221 to 226 are connected to the electric motors 211 to 216, respectively. The sensor units 221 to 226 each include an angle sensor and the sensor 600. The angle sensor detects a corresponding angle of the joints J1 to J6, and the sensor 600 detects corresponding torque of the joints J1 to J6. The servomotors 201 to 206 are connected to respective driving frames in the joints J1 to J6.

The robot arm 200 further includes a servo control unit 230 serving as a drive control unit for controlling the electric motors 211 to 216 of the servomotors 201 to 206. Based on input torque command values, the servo control unit 230 outputs current commands to the electric motors 211 to 216 to adjust torques of the joints J1 to J6 to be at the torque command values, whereby operations of the electric motors 211 to 216 are controlled. While, in the present embodiment, the servo control unit 230 configured of one control unit is described, the servo control unit 230 suitable for each of the electric motors 211 to 216 can be provided.

For example, a hand for grasping a work can be attached to the leading end of the robot arm 200. Using the attached hand, the robot apparatus 100 can perform a job for manufacturing articles, for example, grasping a work and assembling the grasped work to a different work. In addition, a screwdriver can be attached to the leading end of the robot arm 200 so that the robot apparatus 100 can tighten screws. Accordingly, the robot apparatus 100 can primarily perform a job to process the work by using the leading end of the robot arm 200. In the present embodiment, the process also includes a job of grasping and moving a work. Further, the robot arm 200 can work, even though a worker is present near the robot, in cooperation with the worker.

Figure 3:
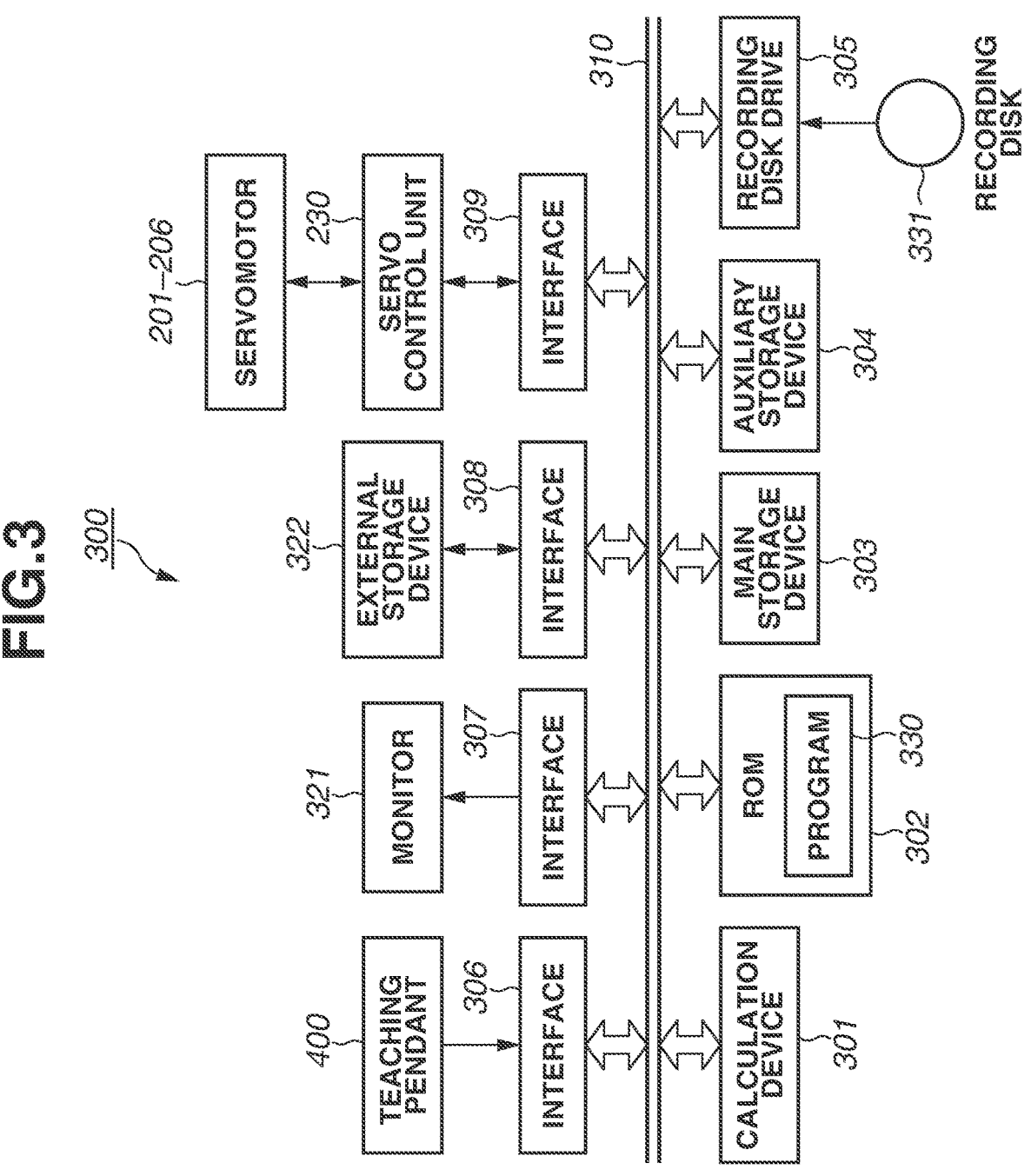
FIG. 3 is a block diagram of a robot control apparatus.

Next, a configuration of the control apparatus 300 will be schematically described with reference to FIG. 3. The control apparatus 300 includes a calculation device 301 serving as a control unit. The calculation device 301 is configured of a Central Processing Unit (CPU), an Application Specific Integrated Circuit (ASIC), or a Field-Programmable Gate Array (FPGA). The control apparatus 300 includes a Read Only Memory (ROM) 302 and a main storage device 303, such as a Random Access Memory (RAM). The ROM 302 stores a program 330, such as a Basic Input/Output System (BIOS), for operating the calculation device 301. The main storage device 303 is a storage device for temporarily storing various kinds of data, such as a calculation processing result of the calculation device 301. The control apparatus 300 includes an auxiliary storage device 304 serving as a storage unit, such as a Hard Disk Drive (HDD) and a Solid State Drive (SSD). The auxiliary storage device 304 stores a calculation processing result of the calculation device 301, or data obtained from outside. In addition, the control apparatus 300 includes a recording disk drive 305 and various kinds of interfaces 306 to 309.

The ROM 302, the main storage device 303, the auxiliary storage device 304, the recording disk drive 305, and the various kinds of interfaces 306 to 309 are connected to the calculation device 301 via a bus 310.

The teaching pendant 400 is connected to the interface 306, and the calculation device 301 receives an input of data of teaching points from the teaching pendant 400 via the interface 306 and the bus 310.

A monitor 321 is connected to the interface 307 to display various kinds of images thereon.

An external storage device 322 is connected to the interface 308, and can be a rewritable non-volatile memory or an external HDD.

The servo control unit 230 is connected to the interface 309, and the calculation device 301 outputs data of a target torque for each of the joints J1 to J6 to the servo control unit 230 at a predetermined time interval via the bus 310 and the interface 309.

The recording disk drive 305 can read out various kinds of data, programs, or the like recorded in a recording disk (recording medium) 331. A recording medium for recording the programs according to the present embodiment is not limited to the recording disk 331, and examples of the recording medium include a non-volatile memory and an external HDD.

Figure 4:
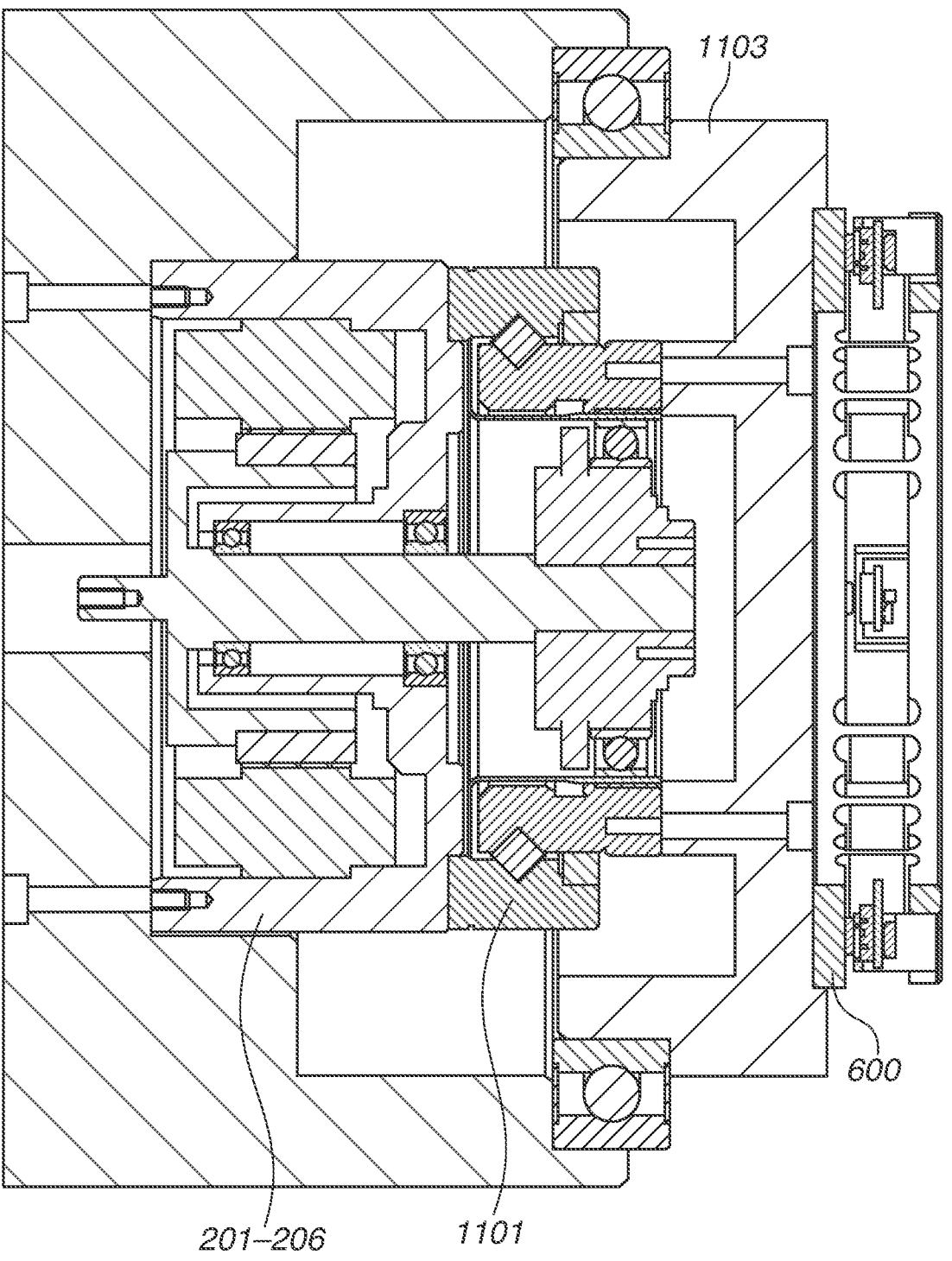
FIG. 4 is an enlarged view of a joint of the robot.

FIG. 4 is an enlarged view of each of the joints J1 to J6 including the sensor 600.

The sensor 600 is connected to a speed reducer 1101 via a sensor attachment member 1103, and the speed reducer 1101 is connected the servomotors 201 to 206.

The structure 614 of the sensor 600 is elliptically deformed by the influence of a rotational vibration due to the servomotors 201 to 206 and the speed reducer 1101 connected to the servomotors 201 to 206. When the structure 614 is elliptically deformed, the stay 609 is deformed, and consequently, the detection head 611 is displaced. As a result, the torque is erroneously detected. Such an influence increases with an increase in transmission efficiency of the deformation of the speed reducer 1101 to the sensor 600.

In other words, the erroneous detection of torque easily occur with the speed reducer 1101 or the sensor attachment member 1103 having lower stiffness. Accordingly, in a case of using the speed reducer 1101 having low stiffness or the sensor attachment member 1103 having low stiffness, the number of the detection units 604 of the sensor 600 is increased, whereby erroneous detection of torque can be reduced in a case where the elliptical deformation occurs. In this way, a highly accurate torque detection can be performed in each of the joints J1 to J6.

In this configuration, the servomotors 201 to 206 or speed reducers 1101 each suitable for the corresponding joint of the joints J1 to J6 are used. For example, the servomotors 201 to 206 or the speed reducers 1101 having rated outputs different from each other are used among the joints J1 to J6. Since the control apparatus 300 performs force control or position control based on the servomotors 201 to 206 of the joints J1 to J6, the sensor 600 desirably covers the rated range of each of the servomotors 201 to 206. On the other hand, if the rated range of each sensor 600 is set too large more than necessary, a required resolution may not be obtained. Thus, the operation accuracy of the robot arm 200 can be improved by making the stiffness of the sensor 600 mounted on each of the joints J1 to J6 suitable for the corresponding joint.

The distance between the speed reducer 1101 and the sensor 600 is a factor in increasing transmission efficiency of the deformation of the speed reducer 1101 to the sensor 600. The distances between the speed reducer 1101 and the sensor 600 in the joints J1 to J6 are different from each other depending on the design of the robot arm 200, and if the distance is short, the influence due to the deformation of the speed reducer 1101 on the sensor 600 becomes large.

In view of the foregoing, in the present embodiment, the number of the detection units 604 is adjusted based on the stiffness of the speed reducer 1101, the stiffness of the torque sensor attachment member 1103, and the difference in the distance between the speed reducer 1101 and the sensor 600.

A robot arm with an operation accuracy improved can be provided by mounting the sensor 600 suitable for each of the joints J1 to J6 thereon.

For example, in a case where the distance between the speed reducer 1101 and the sensor 600 is short, the operation accuracy of the robot arm 200 can be maintained by increasing the number of the detection units 604.

The sensor 600 mounted on each of the joints J1 to J6 of the robot arm 200 is required to have a high torque detection accuracy in addition to the above-described stiffness. With an increase in the number of the detection units 604, the higher accuracy can be obtained by the averaging effect. However, by taking the balance of the cost and size in consideration, it is desirable to determine the number of the detection units 604 suitable for each of the joints J1 to J6.

For example, in the torque sensor that is for a joint less affected by forces in other axial directions, disposing one detection unit 604 is sufficient, and in the torque sensor that is for a joint largely affected by the deformation of the speed reducer, disposing four or more of the detection units 604 is desirable.

Figure 5:
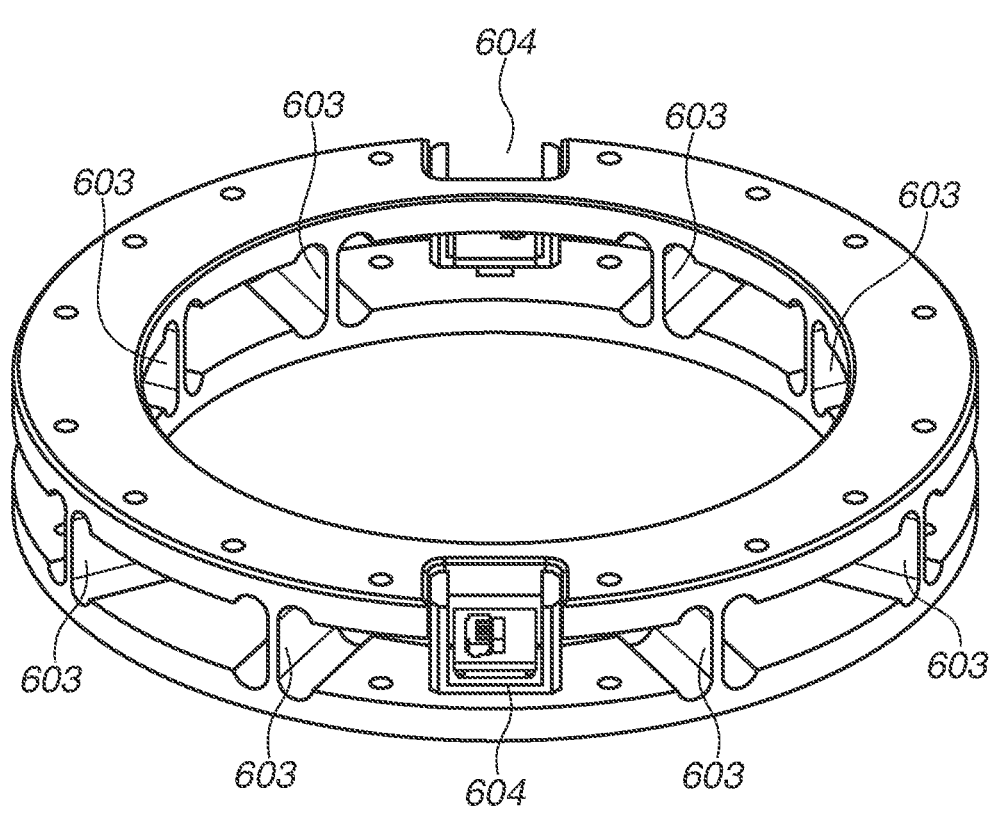
FIG. 5 is a diagram illustrating a modification example of the torque sensor.
Figure 11:
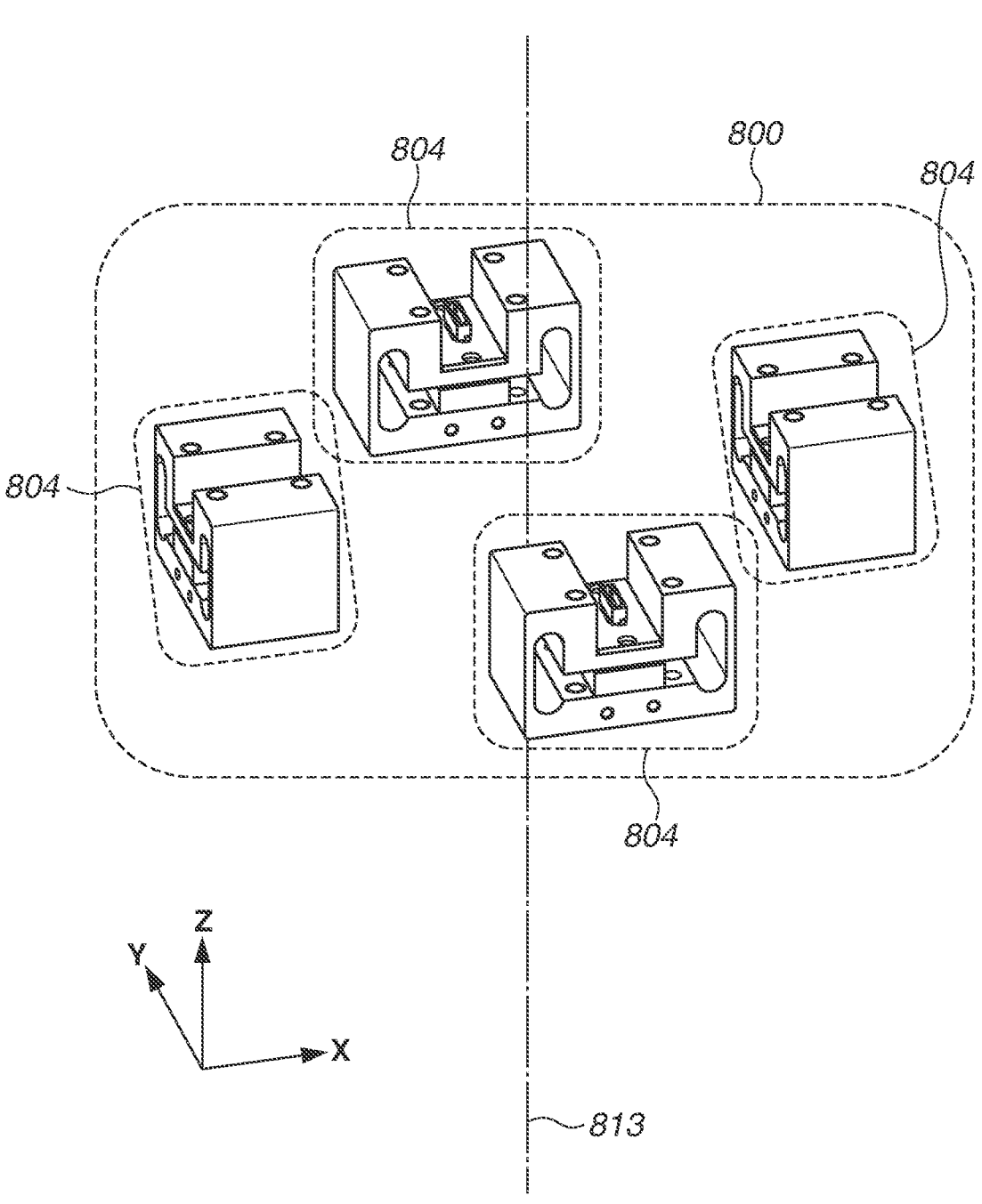
FIG. 11 is a diagram illustrating a distributed torque sensor.

Next, with reference to FIG. 5, a description is given of the sensor 600 having a configuration different from the sensor 600 illustrated in FIG. 1A, among the sensors 600 according to the present embodiment.

The sensor 600 in FIG. 5 is different from the sensor 600 in FIG. 1A in that the number of the detection units 604 is changed from four to two, and the number of the elastic members 603 is changed from twelve to eight.

In the present embodiment, the sensor 600 is improved in resolution, by reducing the number of the elastic members 603 to reduce the stiffness of the sensor 600. In this way, it is possible to provide the sensor 600 having a stiffness suitable for each of the joints J1 to J6, and thus the operation accuracy of the robot arm 200 can be improved. Further, the thickness and the material of the elastic members 603 are standardized to use the elastic members 603 as a common component for the joints J1 to J6, so that the sensor 600 having a stiffness suitable for each of the joints J1 to J6 can be easily provided. The stiffness of the sensor 600 can also be reduced by reducing the size of the sensor 600.

As described above, the number of the elastic members 603 of each of the sensors 600 is increased with magnitude of the rated output of each of the servomotors 201 to 206 and the rated output of each of the speed reducers 1101 in the joints J1 to J6. Further, in a case of using the servomotors 201 to 206 having a small rated output or the speed reducers 1101 having a small rated output in the joints J1 to J6, the number of the elastic members 603 of each of the sensors 600 is reduced. In this way, the design time spent for the sensor 600 can be reduced, and the sensor 600 suitable for each of the joints J1 to J6 can be provided.

The size of the servomotors 201 to 206 mounted on the joints J1 to J6 of the robot arm 200 decreases in order of decreasing distance to the leading end of the robot arm 200. Along with the size reduction of the servomotors 201 to 206, the stiffness required for the sensor 600 becomes smaller. Thus, it is desirable to reduce the number of the elastic members 603 of the sensor 600 in accordance with the position of the sensor 600 in order of decreasing distance to the leading end of the robot arm 200. More specifically, the joint on a side close to the base 250 desirably includes more elastic members 603 in the sensor 600 than the joint on a side close to the leading end of the robot arm 200.

For example, as illustrated in FIG. 6, the sensor 600 including twelve elastic members 603 is mounted on the joint J1 of the robot arm 200, and the sensor 600 including eight to twelve elastic members 603 is mounted on each of the joints J2 and J3. For example, the sensor 600 including four to eight elastic members 603 is mounted on each of the joints J4 and J5, and the sensor 600 including four elastic members 603 is mounted on the joint J6. The difference between the numbers of the elastic members 603 among the joints J1 to J6 is eight or less.

Alternatively, the sensor 600 including eight detection units 604 is mounted on the joint J1 of the robot arm 200, and the sensor 600 including four to eight elastic members 603 is mounted on each of the joints J2 and J3. For example, the sensor 600 including two to four elastic members 603 is mounted on each of the joints J4 and J5, and the sensor 600 including one elastic member 603 is mounted on the joint J6. The difference between the numbers of the elastic members 603 among the joints J1 to J6 is seven or less.

Adjusting the resolution and the accuracy of the joint J6 of the robot arm 200 to be higher than the resolution and the accuracy of the other joints, i.e., the joint J1 to J5, leads to highly accurate operation of the robot arm 200 on the work.

For example, a first joint described in claims is not limited to the joint J1, and can be any joint among the joints J1 to J6. Similarly, an N-th joint described in claims can be any joint among the joints J1 to J6.

Next, with reference to FIG. 7, a configuration of each of the joints J1 to J6 of the robot arm 200 according to a second embodiment will be described. The present embodiment is different from the first embodiment in that the number of the elastic members 603 and the number of the detection units 604 are different from each other among the joints J1 to J6.

In the present embodiment, the stiffness of the sensor 600 is increased by increasing the number of the elastic members 603 in the joint J6 of the robot arm 200. Accordingly, the robot arm 200 can be appropriately applied to even such a job that does not require high resolution and high accuracy to the joint J6, whereby the increase of cost can be suppressed or reduced.

Next, with reference to FIG. 8, a configuration of each of the joints J1 to J6 of the robot arm 200 according to a third embodiment will be described. The present embodiment is different from the first and second embodiments in that the number of the elastic members 603 and the number of the detection units 604 are different from each other among the joints J1 to J6.

More specifically, the number of the elastic members 603 and the number of the detection units 604 are alternately set among the joints J2 to J5. Like the present embodiment, the stiffness of the joint desired to increase the resolution and accuracy can be reduced.

Next, with reference to FIG. 9, a configuration of each of the joints J1 to J6 of the robot arm 200 according to a fourth embodiment will be described. In the present embodiment, the number of the elastic members 603 and the number of the detection units 604 are different from each other among the joints J1 to J6 in a manner different from the first to third embodiments.

More specifically, in the present embodiment, the number of the elastic members 603 and the number of the detection units 604 are increased in the order of the joints J1 to J6. Accordingly, the present embodiment is applicable to the robot arm 200 that is required to have the joint J1 having the highest resolution and accuracy among the joints J1 to J6.

Not limited to the first to fourth embodiments, the number of the elastic members 603 and the number of the detection units 604 in each of the joints J1 to J6 can be set arbitrarily based on the desired performance.

Next, with reference to FIG. 10, a description will be given of a case where the number of joints of the robot arm 200 according to a fifth embodiment is three (i.e., joint A, joint B, and joint C). The joint A is a joint disposed on the side close to the base 250, and the joint C is a joint disposed on the side close to the leading end of the robot arm 200.

In the present embodiment, the stiffness of the joints A to C are different from each other. For example, in a case of a table at the top in FIG. 10, the stiffness is decreased in the order from the joint A, joint B, to joint C. On the other hand, in a case of a table at the bottom in FIG. 10, the stiffness is increased in the order from the joint A, joint B, to joint C.

As shown in other tables, the stiffness of the joint A, joint B, and joint C can be arranged arbitrarily.

In the present embodiment, the case where the number of joints is three (i.e., joints A to C) is described, but the number of joints can be two, or four or more.

Next, with reference to FIGS. 11 to 16, the sensor 600 according to a sixth embodiment will be described.

The sensor 600 according to the present embodiment is different from the sensor according to the first embodiment in that the sensor 600 is a distributed torque sensor 800 (hereinbelow, simply referred to as a distributed sensor 800) in which sensor units 804 each including a detection unit is formed separately, and thus the elastic members 603 are distributed.

The distributed sensor 800 includes a plurality of the sensor units 804. The plurality of the sensor units 804 is desirably arranged to face each other.

Figure 12:
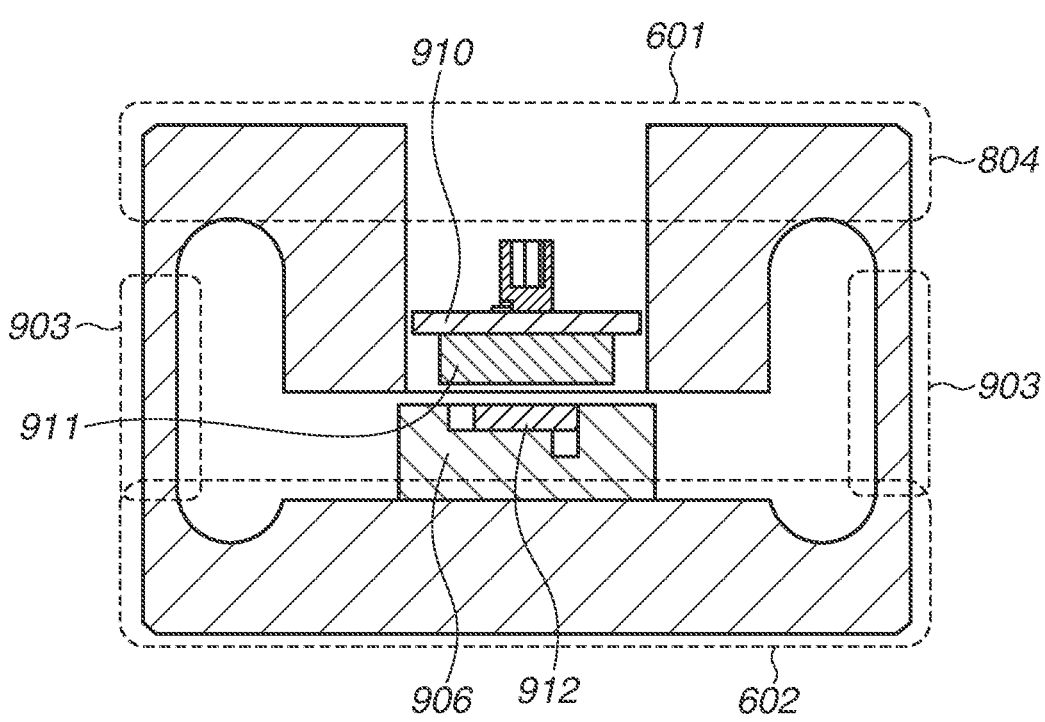
FIG. 12 is a cross-section diagram illustrating a sensor unit related to the distributed torque sensor.

FIG. 12 illustrates a configuration of the sensor unit 804. Similar to the detection unit 604 according to the first embodiment, the sensor unit 804 includes a detection substrate 910, a detection head 911, and a scale 912.

While, in the present embodiment, a stay 906 supports the scale 912, the stay 906 can also support the detection head 911. The sensor unit 804 includes the support member 601, the support member 602, and a pair of elastic members 903, and the displacement of the elastic members 903 is detected by the detection head 911 and the scale 912.

Figure 13:
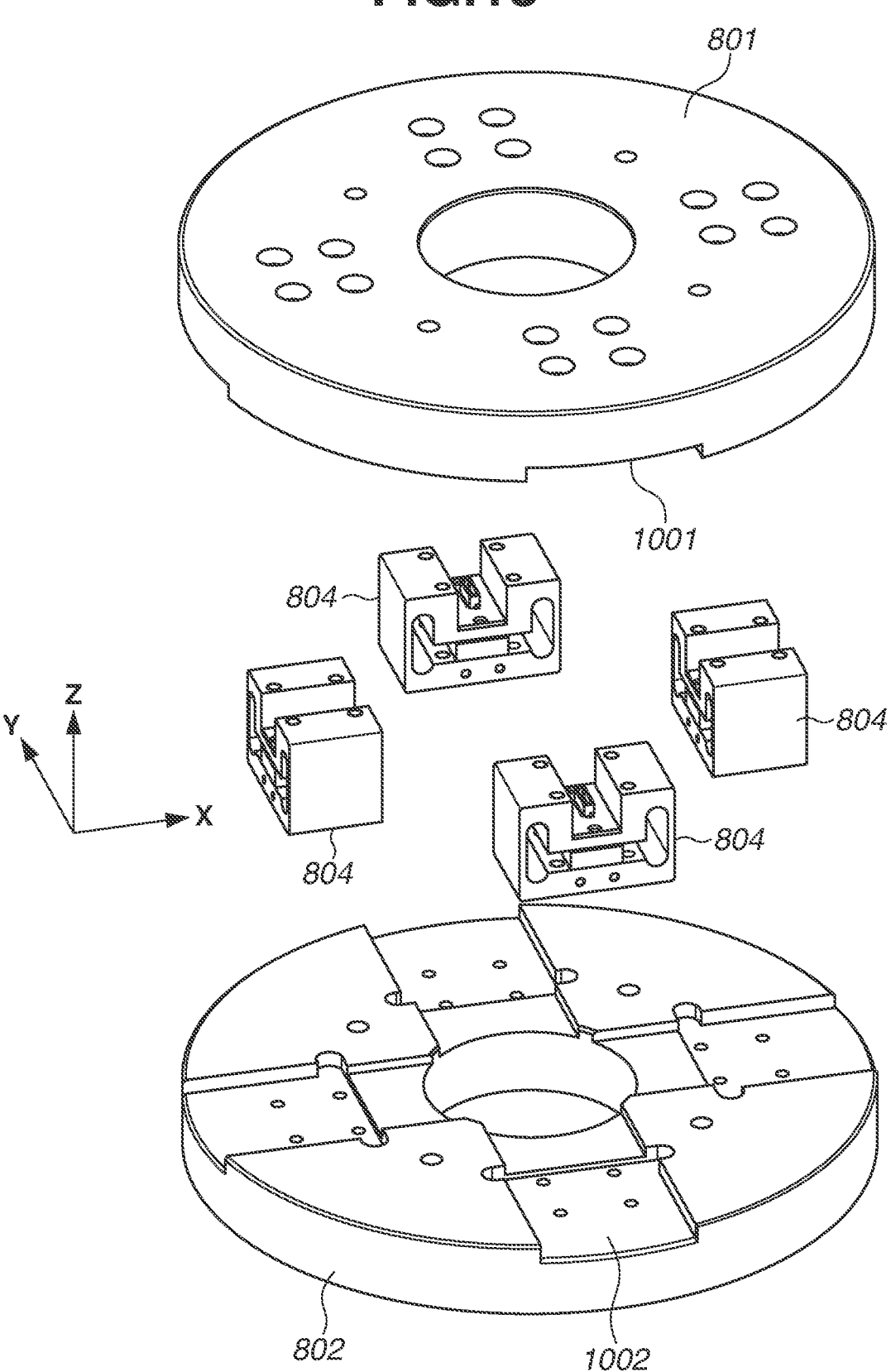
FIG. 13 is a diagram illustrating a configuration of the distributed torque sensor.

When the distributed sensor 800 is mounted on each of the joints J1 to J6 of the robot arm 200, for example, a link member 801 and a link member 802 illustrated in FIG. 13 can be used.

The link members 801 and 802 includes positioning portions 1001 and 1002, respectively, to fit with the sensor unit 804.

Figure 14:
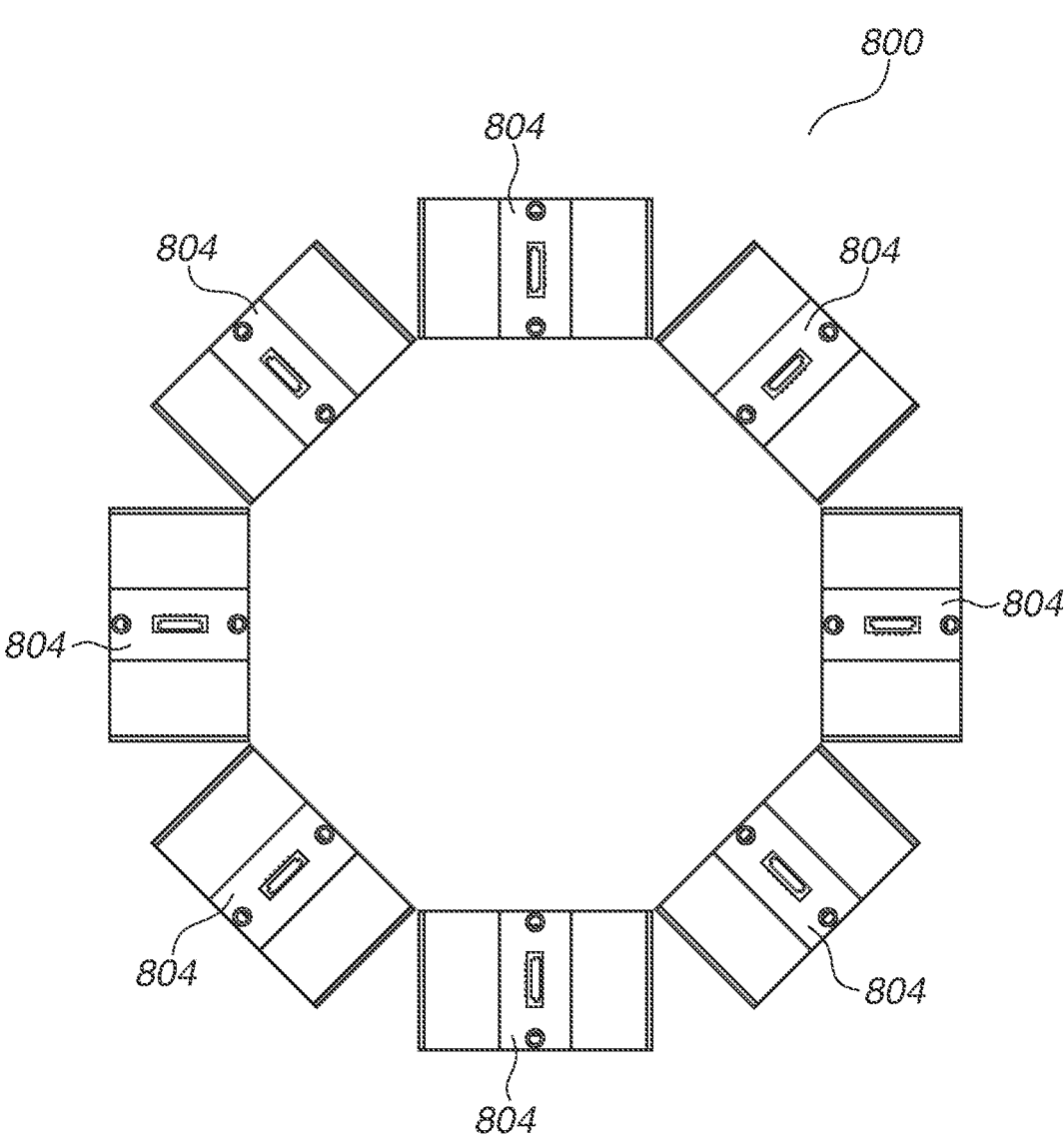
FIG. 14 is a diagram illustrating a distributed torque sensor in which the sensor units are arranged.

FIG. 14 is a top view illustrating the distributed sensor 800 in which eight sensor units 804 are disposed. The distributed sensor 800 suitable for each of the joints J1 to J6 can be easily disposed, by adjusting the number of the sensor units 804 in the distributed sensor 800 based on the desired stiffness and the resolution. While the sensor units 804 each have a shape with a concave portion at the center, not all the sensor units 804 need to have a same shape. Alternatively, the sensor units 804 with different shapes among joints J1 to J6 can be used. A distance from a rotation axis 813 to each of the sensor units 804 does not need to be equal, and the distance can be changed in accordance with the passage of each wiring line. With the similar reason, the sensor units 804 can be shifted from each other to a Z direction, i.e., not need to be arranged on the same plane.

Figure 15:
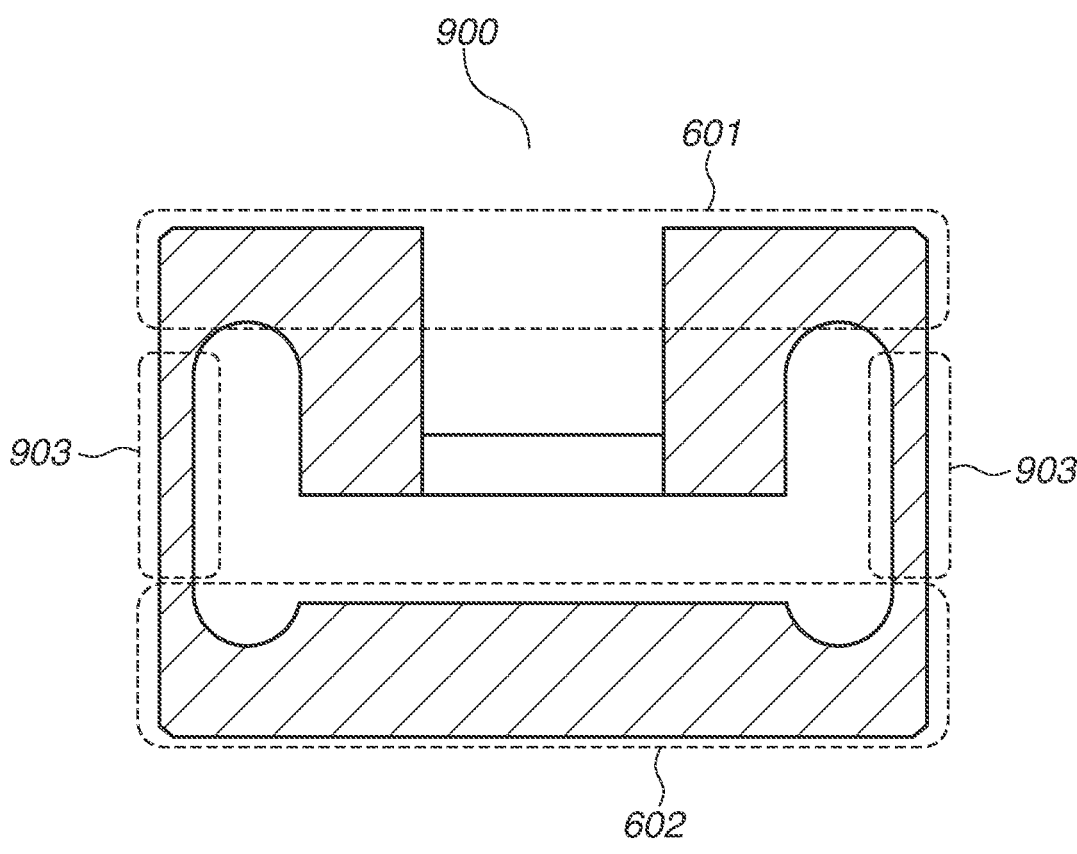
FIG. 15 is a cross-section diagram illustrating a block elastic body related to a distributed torque sensor.

FIG. 15 illustrates a block elastic body 900 that is a unit with the detection unit removed from the sensor unit 804. The block elastic body 900 has a configuration unable to detect torque, different from the above-described sensor unit 804.

The sensor unit 804 and the block elastic body 900 can be fixed to the link members 801 or 802 with, for example, screws, and thus can be easily detached and also replaced.

Figure 16:
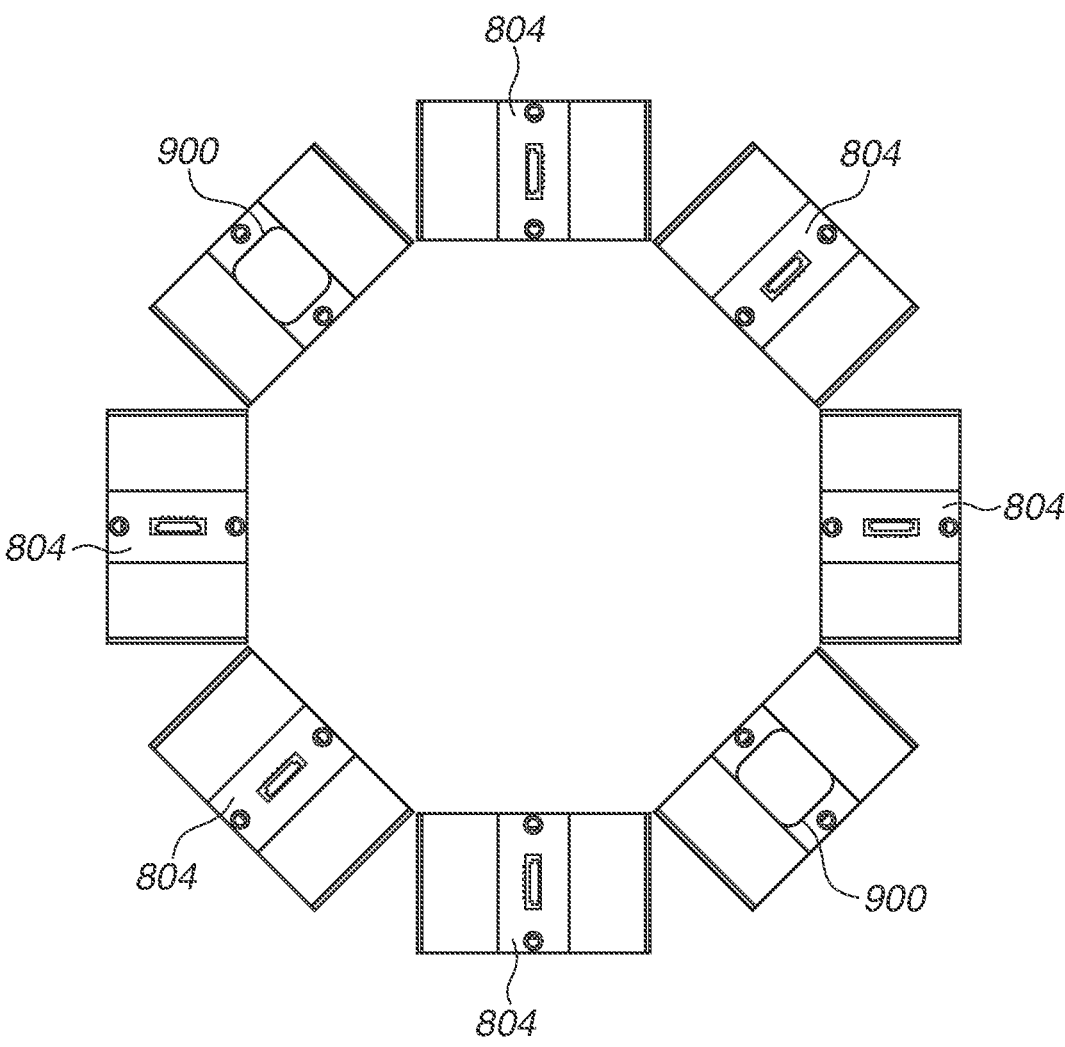
FIG. 16 is a diagram illustrating the distributed torque sensor in which the sensor units and the block elastic bodies are arranged.

FIG. 16 is a top view illustrating the distributed sensor 800 including two block elastic bodies 900 and six sensor units 804. The distributed sensor 800 includes the block elastic bodies 900 as non-detection units that do not detect torque. In this way, the stiffness and resolution can be adjusted without changing the number of the positioning portion 1001 of the link member 801 and the positioning portion 1002 of the link member 802, in accordance with adjustment of the number of the sensor units 804. Accordingly, it is possible to easily arrange the distributed sensor 800 suitable for each of the joints J1 to J6 while maintaining the operation accuracy of the robot arm 200. For example, it is also possible to reduce the weight of the leading end of the robot arm 200 by changing the thicknesses or heights of the sensor units 804 or the elastic members 903 of the block elastic bodies 900 in the joint J6.

The embodiments described above can be appropriately modified and changed without departing from the spirit and scope of the technological thought.

For example, a plurality of the embodiments can be combined. Further, a part of the items of at least one embodiment can be eliminated or replaced.

Further, a new item can be added to at least one embodiment. The disclosed contents of the present specification include not only the contents explicitly described in the present specification, but also all the contents understandable from the present specification and/or the drawings attached to the present specification.

Further, the disclosed contents of the present specification include a complementary set of the individual concept described in the present specification. More specifically, if, for example, there is a description of "A is more than B" in the present specification, and even if there is no description of "A is not more than B", it should be understood that the present specification also discloses that "A is not more than B". It is because if "A is more than B" is described, the case of "A is not more than B" is taken in consideration, as a premise.

According to the present disclosure, it is possible to provide an advantageous technique for improving the operation accuracy of the robot.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2021-210671, filed Dec. 24, 2021, which is hereby incorporated by reference herein in its entirety.

What is claimed is:

1. A robot comprising:
a plurality of joints including a first joint and a second joint,
wherein each of the first joint and the second joint includes
a first support member,
a second support member facing the first support member and configured to be displaceable relative to the first support member,
an elastic member configured to connect the first support member and the second support member, and
a torque sensor including a detection unit configured to detect a relative displacement amount between the first support member and the second support member, and
wherein a number of the detection units of the torque sensor in the first joint is different from a number of the detection units of the torque sensor in the second joint,
wherein each of the first joint and the second joint further includes a speed reducer,
wherein stiffness of the speed reducer in the first joint is higher than stiffness of the speed reducer in the second joint, and
wherein the number of the detection units in the first joint is less than the number of the detection units in the second joint.

2. The robot according to claim 1,
wherein a rated output of a motor in the first joint is lower than a rated output of a motor in the second joint, and
wherein the number of the elastic members in the first joint is less than the number of the elastic members in the second joint.

3. The robot according to claim 1,
wherein a rated output of a speed reducer in the first joint is lower than a rated output of a speed reducer in the second joint, and
wherein the number of the elastic members in the first joint is less than the number of the elastic members in the second joint.

4. The robot according to claim 1,
wherein the robot is fixed on a base, and
wherein the number of the elastic members in the first joint is less than the number of the elastic members in the second joint disposed on a side closest to the base with respect to the first joint.

5. The robot according to claim 1, wherein the torque sensor includes a plurality of sensor units each including a pair of the elastic members and a piece of the detection unit, and the plurality of the sensor units are separately formed, and
wherein the sensor units in the first joint and the sensor units in the second joint have a same shape.

6. The robot according to claim 1, wherein the torque sensor includes a plurality of sensor units each including a pair of the elastic members and a piece of the detection unit, and the plurality of the sensor units are separately formed, and wherein the sensor units in the first joint and the sensor units in the second joint are different from each other in thickness of the elastic member.

7. The robot according to claim 6,
wherein the torque sensor includes an elastic body including a pair of the elastic members, and

wherein the elastic body is a non-detection unit that does not detect the relative displacement amount, and the elastic members of the torque sensor are different from the elastic members of the sensor units in thickness.

8. The robot according to claim 7,
wherein the torque sensor includes a first structure and a second structure facing the first structure, and
wherein the elastic body fits with the first structure and the second structure.

9. The robot according to claim 6,
wherein the torque sensor includes a first structure and a second structure facing the first structure, and
wherein the sensor unit fits with the first structure and the second structure.

10. The robot according to claim 1, wherein a difference between the number of the elastic members in the first joint and the number of the elastic members in the second joint is less than or equal to 8.

11. The robot according to claim 1, wherein the elastic member connects the first support member and the second support member in a direction along a rotation axis of the second support member with respect to the first support member.

12. The robot according to claim 1, wherein a difference between the number of the detection units in the first joint and the number of the detection units in the second joint is less than or equal to 7.

13. The robot according to claim 1, wherein the detection unit includes a detection head and a scale facing the detection head.

14. A robot comprising:
a plurality of joints including a first joint and a second joint,
wherein each of the first joint and the second joint includes
a first support member,
a second support member facing the first support member and configured to be displaceable relative to the first support member,
an elastic member configured to connect the first support member and the second support member, and
a torque sensor including a detection unit configured to detect a relative displacement amount between the first support member and the second support member, and
wherein a number of the detection units of the torque sensor in the first joint is different from a number of the detection units of the torque sensor in the second joint,
wherein each of the first joint and the second joint further includes a torque sensor attachment member to which the torque sensor is attached,
wherein stiffness of the torque sensor attachment member in the first joint is higher than stiffness of the torque sensor attachment member in the second joint, and
wherein the number of the detection units in the first joint is less than the number of the detection units in the second joint.

15. The robot according to claim 14,
wherein a rated output of a motor in the first joint is lower than a rated output of a motor in the second joint, and
wherein the number of the elastic members in the first joint is less than the number of the elastic members in the second joint.

16. The robot according to claim 14,
wherein a rated output of a speed reducer in the first joint is lower than a rated output of a speed reducer in the second joint, and wherein the number of the elastic members in the first joint is less than the number of the elastic members in the second joint.

17. The robot according to claim 14,
wherein the robot is fixed on a base, and
wherein the number of the elastic members in the first joint is less than the number of the elastic members in the second joint disposed on a side closest to the base with respect to the first joint.

18. The robot according to claim 14, wherein the torque sensor includes a plurality of sensor units each including a pair of the elastic members and a piece of the detection unit, and the plurality of the sensor units are separately formed, and
wherein the sensor units in the first joint and the sensor units in the second joint have a same shape.

19. The robot according to claim 14, wherein the torque sensor includes a plurality of sensor units each including a pair of the elastic members and a piece of the detection unit, and the plurality of the sensor units are separately formed, and
wherein the sensor units in the first joint and the sensor units in the second joint are different from each other in thickness of the elastic member.

20. The robot according to claim 19,
wherein the torque sensor includes an elastic body including a pair of the elastic members, and
wherein the elastic body is a non-detection unit that does not detect the relative displacement amount, and the elastic members of the torque sensor are different from the elastic members of the sensor units in thickness.

21. The robot according to claim 20,
wherein the torque sensor includes a first structure and a second structure facing the first structure, and
wherein the elastic body fits with the first structure and the second structure.

22. The robot according to claim 19,
wherein the torque sensor includes a first structure and a second structure facing the first structure, and
wherein the sensor unit fits with the first structure and the second structure.

23. The robot according to claim 14, wherein a difference between the number of the elastic members in the first joint and the number of the elastic members in the second joint is less than or equal to 8.

24. The robot according to claim 14, wherein the elastic member connects the first support member and the second support member in a direction along a rotation axis of the second support member with respect to the first support member.

25. A robot comprising:
a plurality of joints including a first joint and a second joint,
wherein each of the first joint and the second joint includes
a first support member,
a second support member facing the first support member and configured to be displaceable relative to the first support member,
an elastic member configured to connect the first support member and the second support member, and
a torque sensor including a detection unit configured to detect a relative displacement amount between the first support member and the second support member, and
wherein a number of the detection units of the torque sensor in the first joint is different from a number of the detection units of the torque sensor in the second joint, wherein each of the first joint and the second joint further includes a speed reducer and a torque sensor, wherein a distance between the speed reducer and the torque sensor in the first joint is larger than a distance between the speed reducer and the torque sensor in the second joint, and wherein the number of the detection units in the first joint is less than the number of the detection units in the second joint.

26. The robot according to claim 25, wherein a rated output of a motor in the first joint is lower than a rated output of a motor in the second joint, and wherein the number of the elastic members in the first joint is less than the number of the elastic members in the second joint.

27. The robot according to claim 25, wherein a rated output of a speed reducer in the first joint is lower than a rated output of a speed reducer in the second joint, and wherein the number of the elastic members in the first joint is less than the number of the elastic members in the second joint.

28. The robot according to claim 25, wherein the robot is fixed on a base, and wherein the number of the elastic members in the first joint is less than the number of the elastic members in the second joint disposed on a side closest to the base with respect to the first joint.

29. The robot according to claim 25, wherein the torque sensor includes a plurality of sensor units each including a pair of the elastic members and a piece of the detection unit, and the plurality of the sensor units are separately formed, and wherein the sensor units in the first joint and the sensor units in the second joint have a same shape.

30. The robot according to claim 25, wherein the torque sensor includes a plurality of sensor units each including a pair of the elastic members and a piece of the detection unit, and the plurality of the sensor units are separately formed, and wherein the sensor units in the first joint and the sensor units in the second joint are different from each other in thickness of the elastic member.

31. The robot according to claim 30, wherein the torque sensor includes an elastic body including a pair of the elastic members, and wherein the elastic body is a non-detection unit that does not detect the relative displacement amount, and the elastic members of the torque sensor are different from the elastic members of the sensor units in thickness.

32. The robot according to claim 31, wherein the torque sensor includes a first structure and a second structure facing the first structure, and wherein the elastic body fits with the first structure and the second structure.

33. The robot according to claim 30, wherein the torque sensor includes a first structure and a second structure facing the first structure, and wherein the sensor unit fits with the first structure and the second structure.

34. The robot according to claim 25, wherein a difference between the number of the elastic members in the first joint and the number of the elastic members in the second joint is less than or equal to 8.

35. The robot according to claim 25, wherein the elastic member connects the first support member and the second support member in a direction along a rotation axis of the second support member with respect to the first support member.

* * * * *